United States Patent
Hinkle et al.

(10) Patent No.: US 9,473,385 B2
(45) Date of Patent: Oct. 18, 2016

(54) CONTROL OF LONG TERM EVOLUTION (LTE) VIRTUAL NETWORK ELEMENTS BASED ON RADIO NETWORK TUNNELS

(71) Applicant: Sprint Communications Company L.P., Overland Park, KS (US)

(72) Inventors: Aaron Paul Hinkle, Centreville, VA (US); Seng Chai Gan, Ashburn, VA (US); Khoi Dinh Nguyen, Lenexa, KS (US); Danmei Wu, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 182 days.

(21) Appl. No.: 14/204,192

(22) Filed: Mar. 11, 2014

(65) Prior Publication Data

US 2015/0263931 A1  Sep. 17, 2015

(51) Int. Cl.
  *H04L 12/751* (2013.01)
  *H04L 12/781* (2013.01)
  *H04W 76/04* (2009.01)
  *H04W 76/02* (2009.01)
  *H04W 76/06* (2009.01)
  *H04W 92/14* (2009.01)

(52) U.S. Cl.
  CPC ............ *H04L 45/02* (2013.01); *H04L 45/52* (2013.01); *H04W 76/041* (2013.01); *H04W 76/022* (2013.01); *H04W 76/062* (2013.01); *H04W 92/14* (2013.01)

(58) Field of Classification Search
  None
  See application file for complete search history.

(56) References Cited

U.S. PATENT DOCUMENTS

| | | | |
|---|---|---|---|
| 8,111,630 B2 | 2/2012 | Kovvali et al. | |
| 2012/0300615 A1* | 11/2012 | Kempf | H04W 24/02 370/216 |
| 2013/0054761 A1 | 2/2013 | Kempf et al. | |
| 2014/0003233 A1* | 1/2014 | Rune | H04L 47/125 370/230 |
| 2014/0146673 A1* | 5/2014 | Parker | H04L 47/10 370/235 |
| 2014/0169269 A1* | 6/2014 | Salot | H04W 48/20 370/328 |

FOREIGN PATENT DOCUMENTS

| | | |
|---|---|---|
| CN | 102473162 | 5/2012 |
| WO | 2012140158 | 10/2012 |
| WO | 2012160465 A1 | 11/2012 |
| WO | 2013144747 A1 | 10/2013 |

\* cited by examiner

*Primary Examiner* — Edan Orgad
*Assistant Examiner* — Saumit Shah

(57) ABSTRACT

An LTE network, having a plurality of base stations and S-GWs, processes GTP packets to determine an amount of GTP tunnels between the base stations and the S-GWs gateways. The LTE network processes the amount of GTP tunnels to determine a target amount of LTE P-GWs to serve the base stations. If the target amount of the LTE P-GWs is greater than a current amount of the LTE P-GWs, then an additional amount of virtual LTE P-GWs is implemented to serve the base stations. If the target amount of the LTE P-GWs is less than the current amount of the LTE P-GWs, then an extra amount of the virtual LTE P-GWs that serve the base stations are removed.

18 Claims, 6 Drawing Sheets

CONTROL OF LONG TERM EVOLUTION (LTE) VIRTUAL NETWORK ELEMENTS BASED ON RADIO NETWORK TUNNELS

TECHNICAL BACKGROUND

Cellular telecommunication presents unique signaling challenges, such as mobility and paging. To overcome these challenges, the generic Internet Protocol (IP) stack is augmented by GPRS (General Packet Radio Service) Tunneling Protocol (GTP) as used by Long Term Evolution (LTE) cellular networks. GTP version 1 uses User Datagram Protocol (UDP) for packet transmission over an IP link.

The user plane of LTE uses GTP tunnels for voice bearer and data bearer transmission. The GTP-U protocol is the variant of GTP used on the user plane. Typically a separate GTP-U tunnel is used for each bearer channel. A GTP tunnel is identified by a conceptual triplet having the destination UDP address, the destination UDP port, and the Tunnel Endpoint Identifier (TEID) of the destination. GTP may multiplex tunnels onto one UDP pathway. A sequential pair of GTP-U tunnels is needed to provide bearer from an eNodeB through a servicing gateway (S-GW) and on to a PDN (Packet Data Network) Gateway (P-GW).

The Evolved Packet Core (EPC) is the core network of LTE. Within the EPC are a diversity of node types, such as S-GW, P-GW, and others. Each node type is dedicated to particular internal functions of the EPC. Regardless of type, nodes within the EPC may be virtualized as virtual network elements (VNE). A virtualization environment may have within itself a population of VNEs. A new VNE is dynamically added to the virtualization environment by instantiation. A surplus VNE is deleted from the virtualization environment by removal. Addition or deletion may also be achieved by migration between multiple virtualization environments.

TECHNICAL OVERVIEW

An LTE network, having a plurality of base stations and S-GWs, processes GTP packets to determine an amount of GTP tunnels between the base stations and the S-GWs. The LTE network processes the amount of GTP tunnels to determine a target amount of LTE P-GWs to serve the base stations. If the target amount of LTE P-GWs is greater than a current amount of LTE P-GWs, then an additional amount of virtual LTE P-GWs is implemented to serve the base stations. If the target amount of LTE P-GWs is less than the current amount of LTE P-GWs, then an extra amount of virtual LTE P-GWs that serve the base stations are removed.

DETAILED DESCRIPTION

Figure 1:
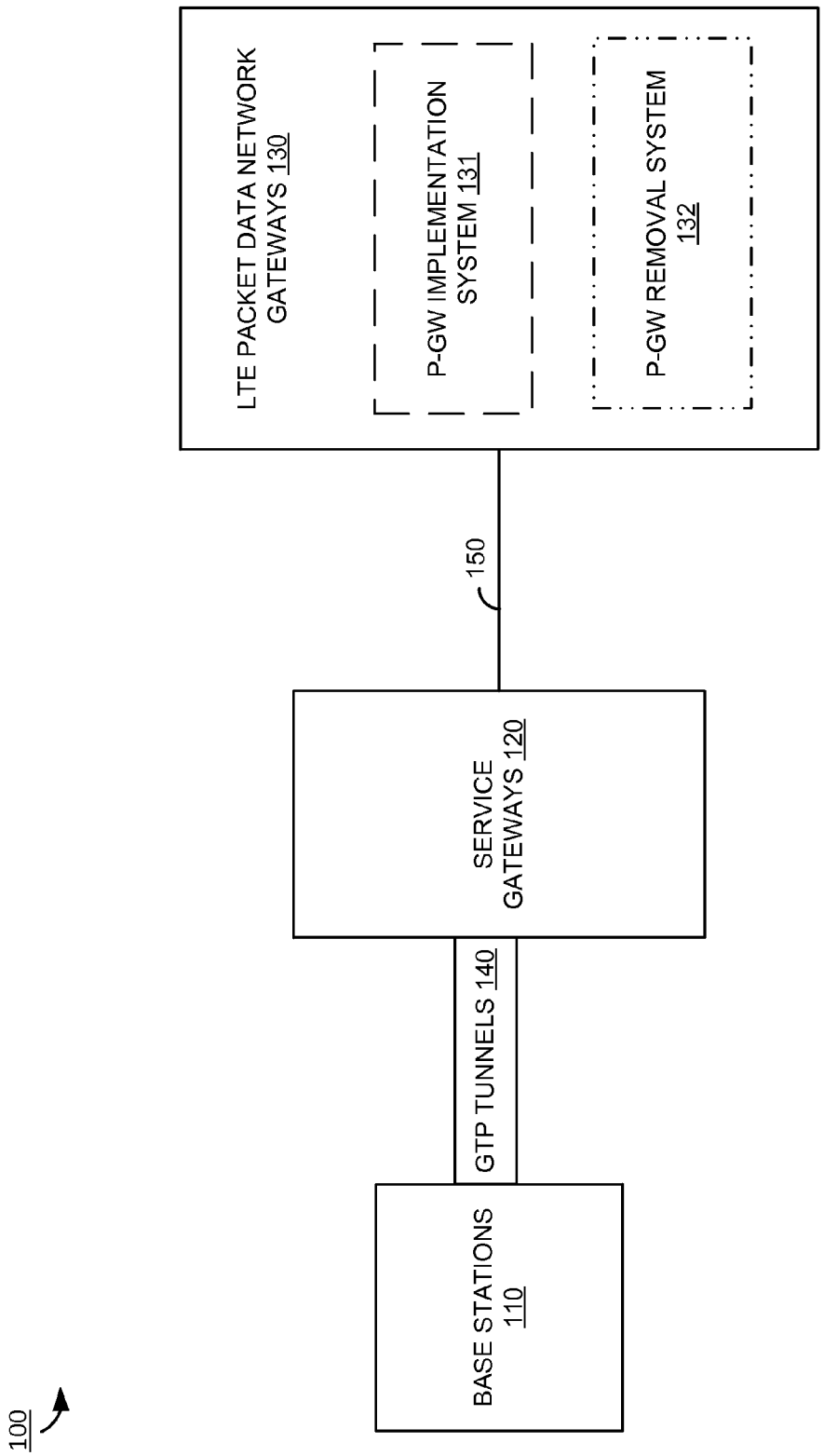
FIG. 1 illustrates an LTE network that processes the amount of GTP tunnels to control the amount of virtual P-GWS.

FIG. 1 illustrates LTE network 100 that processes the amount of GTP tunnels to control the amount of virtual P-GWs. LTE network 100 includes one or more base stations 110, one or more S-GWs 120, and a dynamic number of virtual P-GWs 130. Base stations 110 may have a mix of base station types, such as picocells, femtocells, microcells, eNodeB macrocells, or other wireless access points. S-GWs 120 are serving gateways that may assist with mobility and paging. S-GWs 120 and base stations 110 communicate through one or more GTP tunnels 140. Each of GTP tunnels 140 may use a different GTP protocol such as GTPv1-U or GTP prime.

Virtual P-GWs 130 are packet data network gateways that are virtualized and communicate with S-GWs 120 over communication link 150. Virtual P-GWs 130 may be virtual network elements, virtual machines, or another structure for which instances can be dynamically added and removed. Because virtual P-GWs 130 are dynamically added and removed, the amount of virtual P-GWs 130 changes. As instantaneous demand for P-GWs fluctuates, the amount of virtual P-GWs 130 is adjusted to fit demand.

Demand for P-GWs may be determined from the amount of GTP tunnels 140. The amount of GTP tunnels 140 may be a count of GTP tunnels 140, a count of QCI classes having dedicated GTP tunnels 140, or any other GTP tunnel metric indicating the extent of GTP tunnels 140. Because GTP tunnels are logical connections, GTP may multiplex many tunnels though a single IP port. As such generic IP packet header statistics or inspection can be insufficient to determine the amount of GTP tunnels 140.

The amount of GTP tunnels 140 is determined by processing GTP packets that pass through GTP tunnels 140. Processing GTP packets may involve examining fields of packet headers. As a consequence of packet enveloping performed by GTP tunneling, packets may be nested within packets. This nesting means that multiple packet headers within a GTP packet may provide fields to process for measuring the amount of GTP tunnels 140. Packet header fields to be processed may include GTP header fields, such as a TEID field. Packet header fields to be processed may include IP header fields of the enveloping IP packet or the tunneled IP packet, such as a source or destination UDP port number. An amount of GTP tunnels 140 may also be inferred from Session Initiation Protocol (SIP) message header fields.

With an amount of GTP tunnels 140 determined, a target amount of P-GWs is then determined, and the amount of virtual P-GWs 130 is adjusted to match the target amount. P-GW removal system 132 removes an amount of virtual P-GWs 130 from service. If the target amount of P-GWs falls below the amount of virtual P-GWs 130, then P-GW removal system 132 is instructed to remove an amount of virtual P-GWs 130. P-GW removal system 132 may remove an amount of virtual P-GWs 130 by suspension, deletion, migration, return to a free pool, or other status change that includes an amount of virtual P-GWs going out of service. P-GW implementation system 131 implements an amount of virtual P-GWs 130. If the target amount of P-GWs exceeds the amount of virtual P-GWs 130, then P-GW implementation system 131 is instructed to implement an amount of virtual P-GWs 130. P-GW implementation system 132 may implement an amount of virtual P-GWs 130 by activation, instantiation, migration, allocation from a free pool, or other status change that includes an amount of virtual P-GWs going into service.

Figure 2:
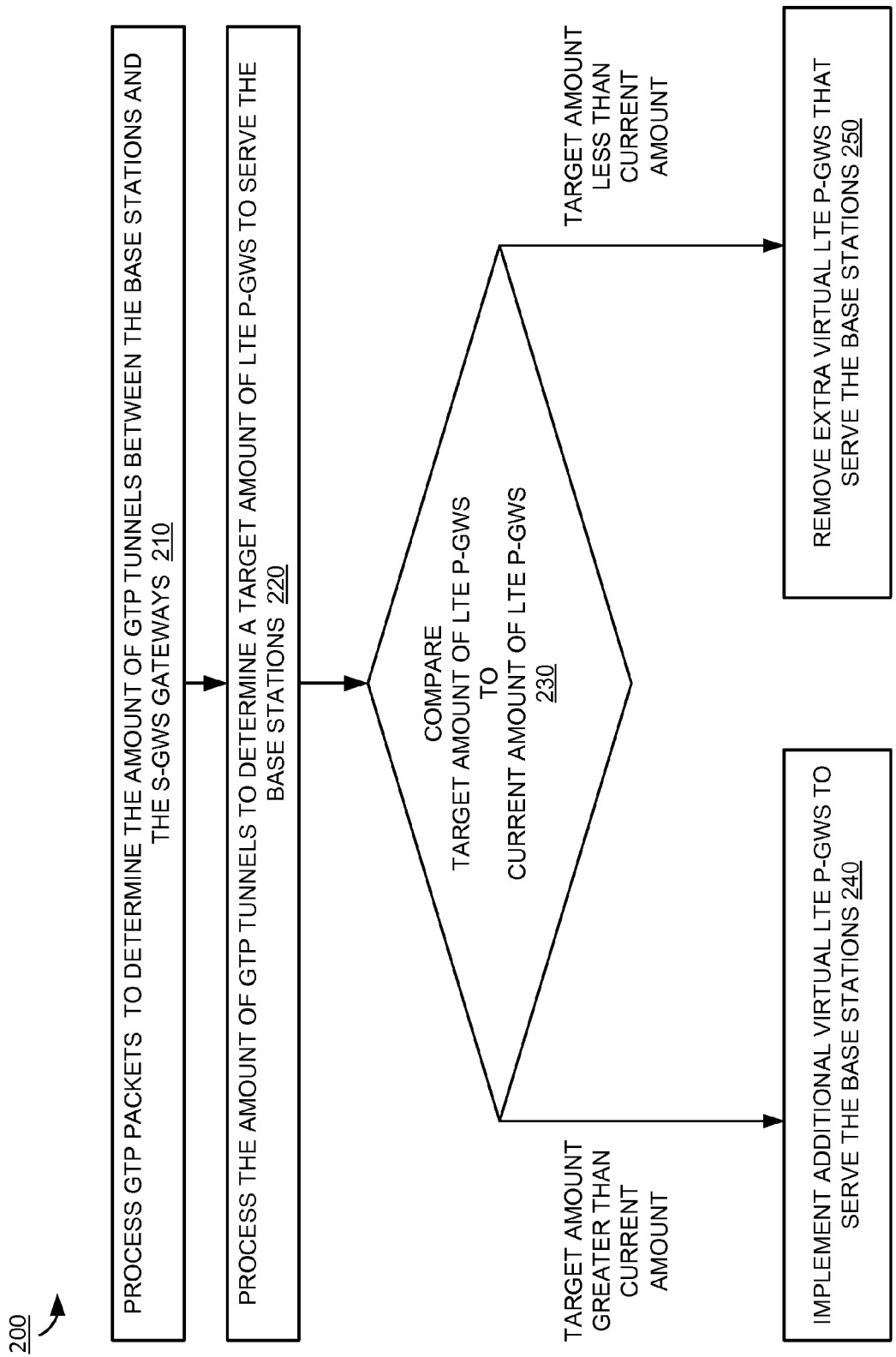
FIG. 2 illustrates the behavior of an LTE network that processes the amount of GTP tunnels to control the amount of virtual P-GWS.

The states and operations involved with processing the amount of GTP tunnels to control the amount of virtual P-GWs 130 are illustrated as behaviors 200 in FIG. 2. LTE network 100 processes (210) GTP packets to determine the amount of GTP tunnels 140 between base stations 110 and S-GWs 120. LTE network 100 processes (220) the amount of GTP tunnels 140 to determine a target amount of P-GWs to serve base stations 110. The target amount is compared (230) to the amount of virtual P-GWs 130. If the target amount of P-GWs exceeds the amount of virtual P-GWs 130, then LTE network 100 implements (240) an additional amount of virtual P-GWs to serve the base stations. If instead the target amount of P-GWs is less than the amount of virtual P-GWs 130, then LTE network 100 removes (250) the extra amount of virtual P-GWs that serve base stations 110.

LTE network 100 may control the amount of other virtual LTE network elements that serve the base stations in a like manner—either in combination with P-GW control or as an independent control process. For example, LTE network 100 may process the amount of GTP tunnels to determine target amounts S-GWs, Mobility Management Entities (MMEs), Policy Control Rules Functions (PCRFs), Wireless Fidelity (WiFi) Gatetways, 2G/3G gateways, media coding servers, application servers, network control systems, backhaul resources, and the like. Different thresholds and logic may be used for these individual control processes on a per network element basis.

Figure 3:
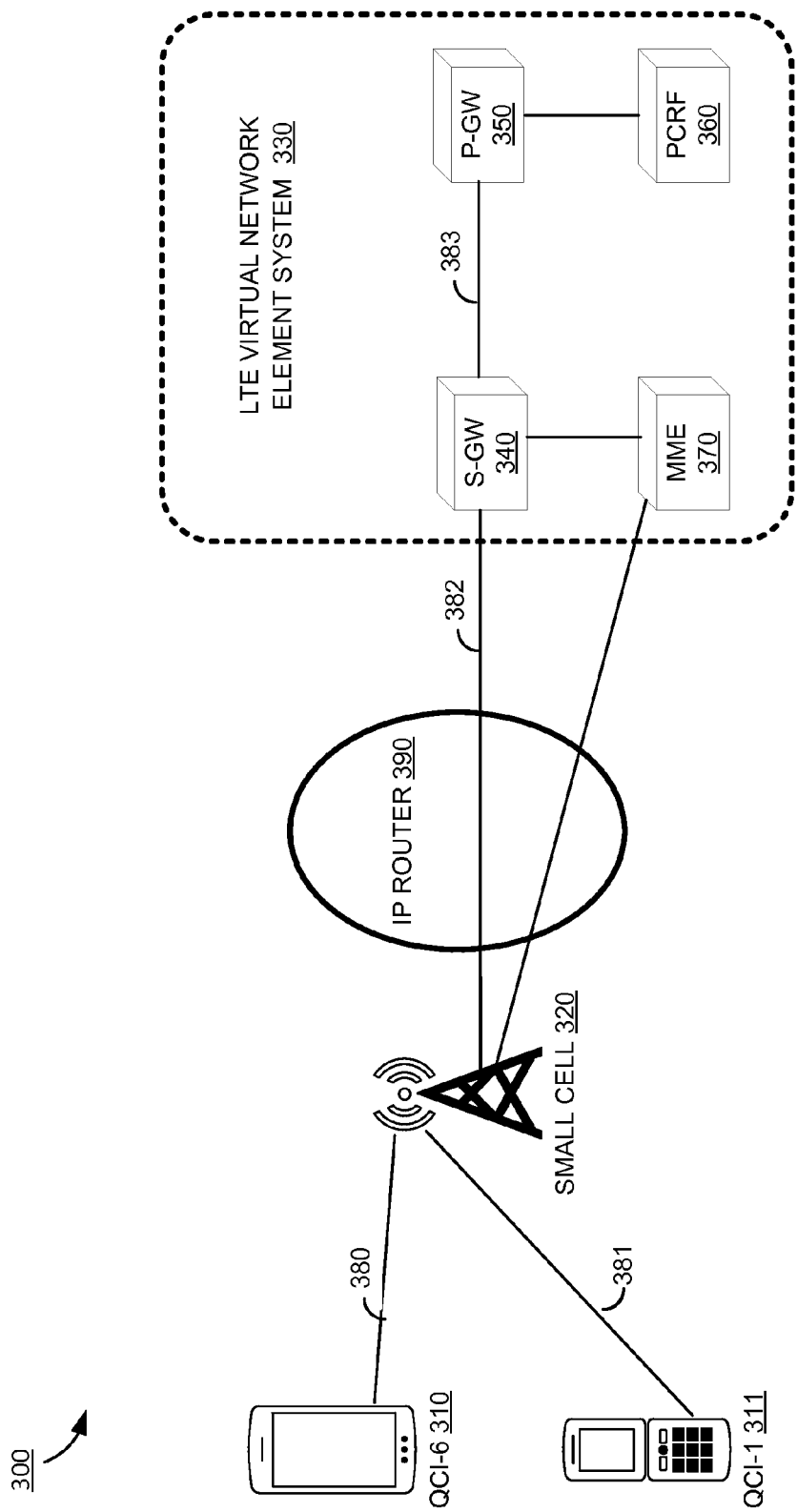
FIG. 3 illustrates an LTE network that processes the amount of GTP tunnels to control the amount of virtual P-GWS.

FIG. 3 illustrates LTE network 300 that includes LTE virtual network element (VNE) system 330, small cell 320, and cell phones 310-311. Cell phones 310-311 may use LTE data bearers and voice bearers to perform a variety of communication functions such as make VoLTE calls, watch video streams, and browse web pages. Cell phones 310-311 may each simultaneously perform multiple communication functions. Each communication function has an assigned QoS (Quality of Service) Class Identifier (QCI) that LTE network 300 uses for network traffic prioritization. In this example cell phone 310 is a smart phone used to view a video stream. The video stream has a QCI of 6, which is appropriate for receiving a video stream. Cell phone 311 is engaged in a VoLTE call, which appropriately has a QCI of 1.

The video stream and the VoLTE call are carried as radio transmissions along LTE-Uu links 380-381 respectively, over which cell phones 310-311 are attached to small cell 320. Small cell 320 is an LTE base station such as a picocell, femtocell, microcell, or other wireless access point. Although not shown another implementation could use an eNodeB macrocell as small cell 320. In a subscriber dense environment such as a professional sports stadium during a game, small cell 320 might be a femtocell serving subscribers seated in the stadium bleachers or an eNodeB serving subscribers in the stadium parking lot.

Cell phone 310 receives a video stream, and cell phone 311 performs a VoLTE call. The user plane traffic of the video and the VoLTE flow along UDP pathway 382 that spans the S1-U interface between small cell 320 and S-GW 340. Along UDP pathway 382 the video stream flows through a GTP-U tunnel dedicated to the video stream having a QCI of 6. Also along UDP pathway 382, the VoLTE call is carried by another GTP-U tunnel dedicated to the VoLTE call having a QCI of 1.

As shown and in accordance with the GTP-U protocol, these VoLTE and video GTP-U tunnels are multiplexed over UDP pathway 382 by assigning each GTP-U tunnel a separate TEID. In an alternate implementation although not shown and also in accordance with the GTP-U protocol, these two GTP-U tunnels could use separate UDP pathways between small cell 320 and S-GW 340 instead of multiplexing both tunnels over a single UDP pathway. Separate UDP paths between small cell 320 and S-GW 340 are achieved by varying the UDP port number.

S-GWs 340 is a set of S-GW VNEs residing in VNE system 330. VNE system 330 is a set of virtual machine servers, managed runtime environments, application servers, or other containers that dynamically instantiate and remove VNEs. VNE system 330 hosts VNEs of diverse types that occur in the EPC of LTE such as S-GW 340, P-GW 350, PCRF 360, and MME 370 as shown.

On the edge of VNE system 330 is UDP pathway 382 that passes the video and VoLTE GTP-U tunnels through IP router 390. IP router 390 is a cell site router, a cell site aggregation router, a radio network controller, or any network node that can inspect and relay IP packets. These two GTP-U tunnels are dedicated to bearer channels having QCIs of 6 and 1 respectively. IP router 390 processes these QCIs to determine a target amount of S-GWs. IP router 390 obtains QCIs of GTP-U tunnel traffic in a way that is implementation dependent because QCI does not appear in the standard header fields for IP, GTP, and SIP. However IP router 390 may obtain QCIs by performing GTP session correlation, inspecting application or custom header fields, performing deep packet inspection, or analyzing PDP context signaling.

IP router 390 may process QCIs to determine a target amount of S-GWs. Instead IP router 390 may process the amount of GTP tunnels to determine the target amount of S-GWs. In either case IP router 390 determines a target amount of S-GWs and instructs VNE system to achieve the target amount. VNE system 330 implements or removes virtual SG-Ws as needed to achieve the target amount.

As the amount of subscribers and their activities fluctuate, demand for amounts and QCIs of GTP-U tunnels along UDP pathway 382 also fluctuates. Because the EPC has network nodes dedicated to serving collections of mobile devices, as amounts and QCIs of GTP-U tunnels fluctuates, so too the optimal amount of each type of EPC node fluctuates. Hence IP router 390 may tell VNE system 330 a target amount of each type of EPC node, shown as S-GW 340, P-GW 350, PCRF 360, and MME 370.

As a set of virtual LTE mobility management entities, MMEs 370 manages the lifecycle of bearer channels, which use GTP-U tunnels. PCRFs 360 is a set of virtual LTE Policy and Charging Rules Functions that meters the amount and QCI of the bearer channels. S-GWs 340 is a set of virtual LTE serving gateways, and P-GWs 350 is a set of virtual LTE PDN gateways. Between one of S-GWs 340 and one of P-GWs 350 flow the bearer channels through GTP-U tunnels along UDP path 383. These are GTP-U tunnels within the EPC, which are not the GTP-U tunnels along UDP path 382. However the GTP-U tunnels within the EPC are connected to the GTP-U tunnels along UDP path 382. As such demand for S-GW 340, P-GW 350, PCRF 360, and MME 370 fluctuates with either the amount or QCI of GTP-U tunnels along UDP path 382. For each of these EPC node types, IP router 390 may use a separate lookup table to determine a target amount of virtual nodes from an amount or QCIs of GTP-U tunnels.

Figure 4:
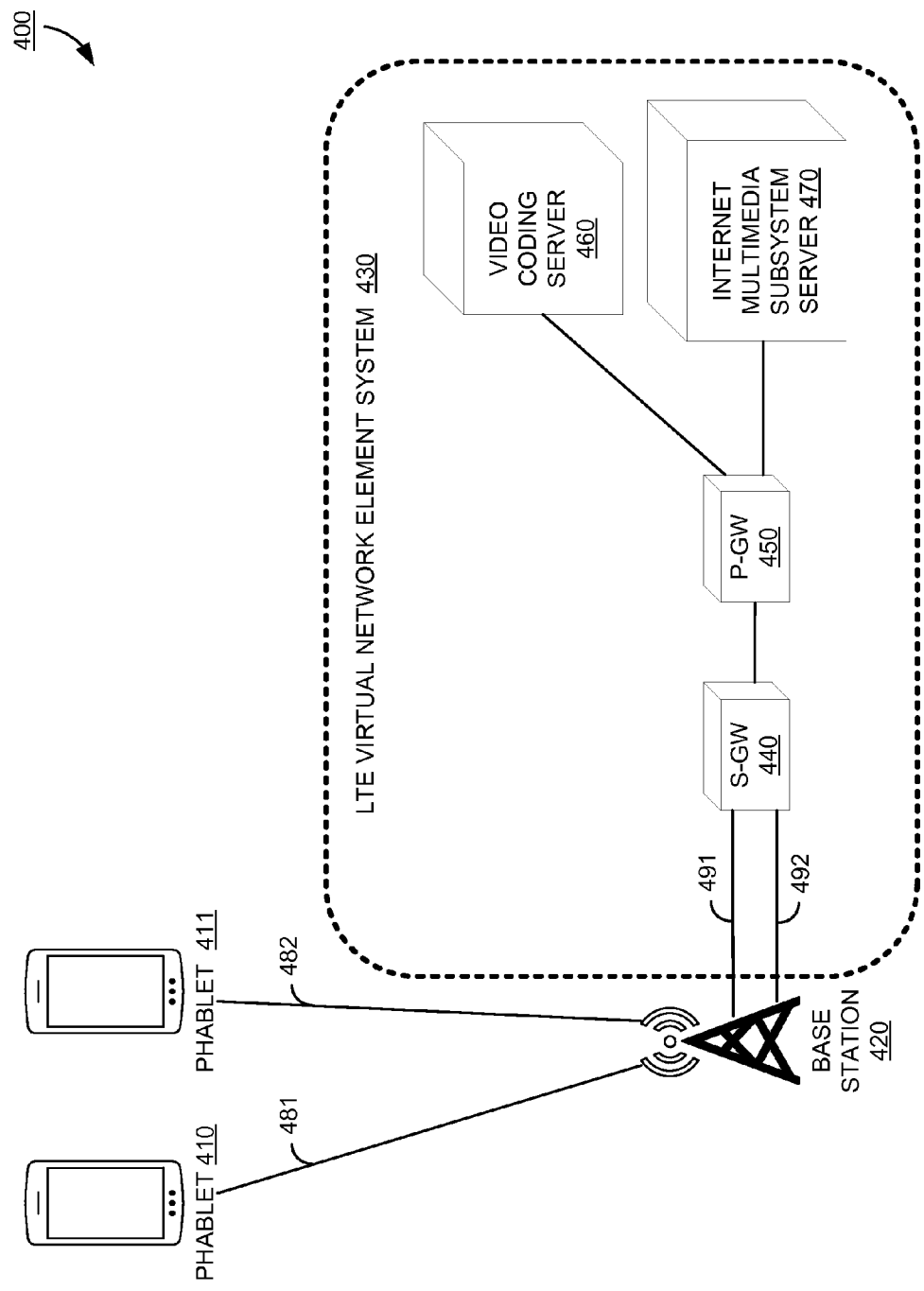
FIG. 4 illustrates an LTE network that processes the amount of GTP tunnels to control the amount of virtual P-GWs.

FIG. 4 illustrates LTE network 400 which includes VNE system 430, base stations 420, and cell phones 410-411. Cell phones 410-411 are any LTE user equipment that attach to base station 420 over LTE-Uu links 481-482 respectively. Base stations 420 is a set of any type of LTE wireless access point, such as an eNodeB or a femtocell. VNE system 430 is a set of virtual machine servers, managed runtime environments, application servers, or other containers that dynamically instantiate and remove VNEs.

In this example each of cell phones 410-411 is a phablet receiving a separate video stream. These video streams are managed by Internet Multimedia Subsystem (IMS) servers 470. IMS servers 470 is a set of VNEs that provide any of the core functionalities of an LTE IP multimedia subsystem, such as SIP or HSS negotiation for streaming, conferencing, interactive voice response, or other multimedia applications. Original video streams may exceed the capacity or capability of the core network, the backhaul network, the air interface, or cell phones 410-411. Video coding servers 460 is a set of VNEs that transcode an original video stream into a more compatible or less intensive derived video stream for delivery to cell phones 410-411.

IMS servers 470, video coding servers 460, P-GWs 450, and S-GWs 440 are sets of VNEs involved with managing or delivering the video streams to cell phones 410-411. As demand for video and other multimedia modalities managed by VNE system 430 fluctuates, two things happen. First, the amount of GTP-U tunnels between base stations 420 and S-GW 440 changes. Second, demand for the VNEs 440, 450, 460, and 470 also changes. Therefore LTE network 400 is configured to determine target amounts of the different types of VNEs by processing the amount or QCIs of those GTP-U tunnels. LTE network 400 instructs VNE system 430 to adjust the current amounts of the types of VNEs to match the target amounts.

Also virtualized by VNE system 430 is the logical networking that provides the S1-U interface for the backhaul between base stations 420 and SG-Ws 440. As the allocation of GTP-U tunnels between base stations 420 and S-GW 440 fluctuates, demand for backhaul bandwidth changes. In this example the backhaul link between base stations 420 and SG-Ws 440 is implemented as a set of virtual networks, each offering a fixed amount of bandwidth. Each virtual network in the set may be dedicated to serve a subset of base stations, subscribers, QCIs, bearers, or other granularity.

LTE network 400 is configured to determine a target amount of backhaul bandwidth by processing amounts or QCIs of GTP-U tunnels between base stations 420 and S-GW 440. For example LTE network 400 may determine that aggregating two virtual networks, shown as virtual networks 491-492, is needed to achieve the target amount of a backhaul bandwidth. In this example virtual networks are a convenience for elastically providing increments of backhaul bandwidth. Another implementation may dynamically provision backhaul bandwidth by processing the amount or QCIs of GTP-U tunnels, but without virtual networking.

Figure 5:
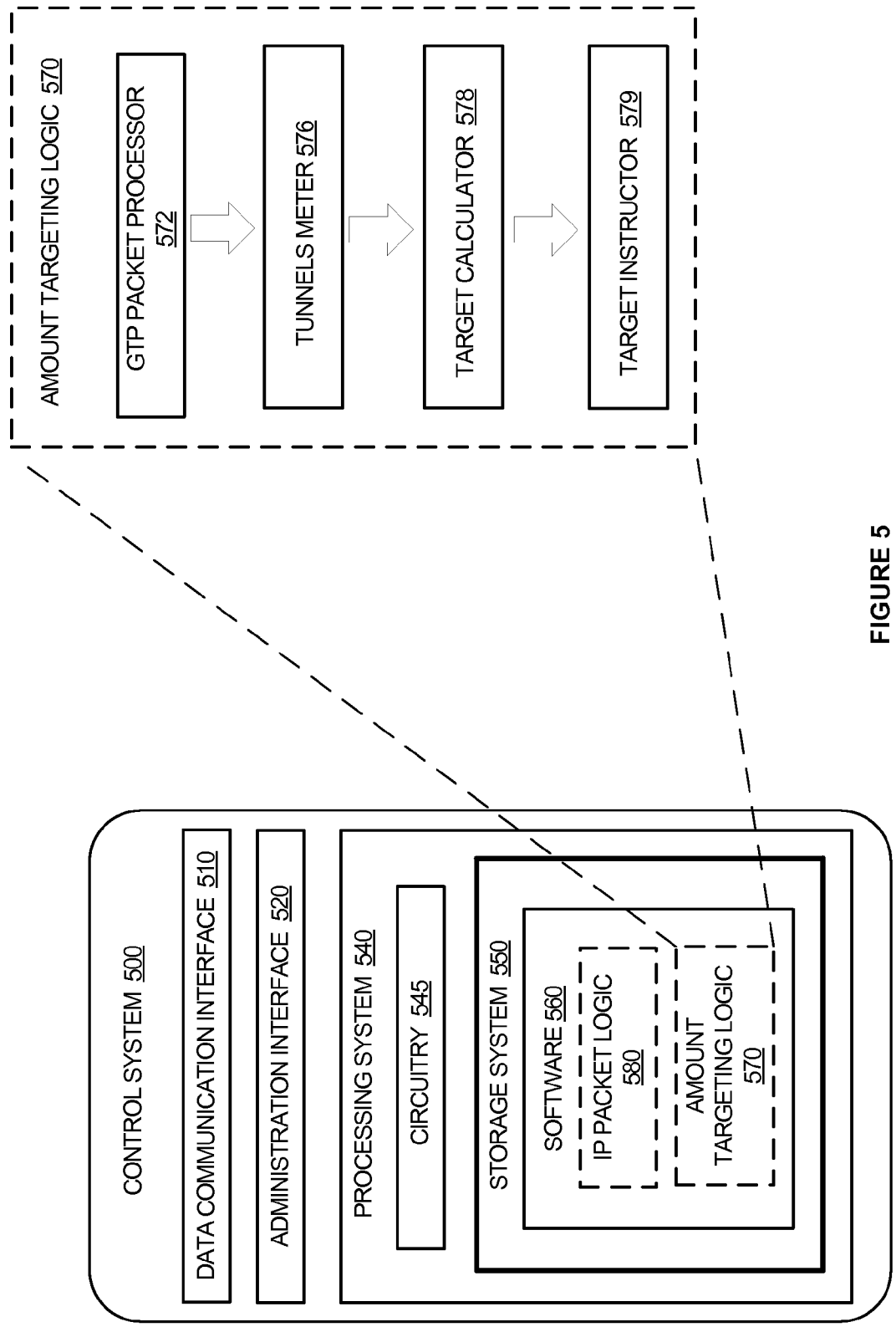
FIG. 5 illustrates an internal configuration of a controller system that processes the amount of GTP tunnels to control the amount of virtual P-GWs.

FIG. 5 illustrates an internal configuration of control system 500 that implements steps 210 and 220 of behaviors 200 for processing the amount of GTP tunnels to determine a target amount of P-GWs and other VNEs. Control system 500 may be the internal configuration of IP router 390 or a component of LTE networks 100 and 400. An implementation of LTE network 400 may embed control system 500 within VNE system 430. Another implementation may consolidate LTE network 300 by embedding control system 500 within IP router 390, and embedding IP router 390 within VNE system 330. However IP router 390 and LTE networks 100 and 400 may have different internal configurations.

Control system 500 includes data communication interface 510, administration interface 520 and processing system 540. Processing system 540 is linked to data communication interface 510 and administration interface 520. Processing system 540 includes processing circuitry 545 and storage system 550, which are connected. Storage system 550 stores operating software 560. Control system 500 may include other well-known components such as a power supply and enclosure that are not shown for clarity.

Data communication interface 510 connects to network infrastructure via a set of network links which each may by wireless or cabled. Control system 500 communicates with LTE base stations, VNE systems, and other LTE network components over data communication interface 510. Data communication interface 510 has communication circuitry such as an amplifier, filter, signal modulator, and signal processing circuitry that is appropriate to the transmission medium that carries the network link.

Administration interface 520 includes hardware necessary to achieve configuration and monitoring of control system 500. Administration interface 520 may include user interface devices such as a display and keyboard. Administration interface 520 may accept administration commands issued remotely and received perhaps by data communication interface 510.

Processing circuitry 545 comprises microprocessor and other circuitry that retrieves and executes operating software 560 from storage system 550. Storage system 550 comprises a non-transitory storage medium, such as a disk drive, flash drive, data storage circuitry, or some other memory apparatus. Processing circuitry 545 is typically mounted on a circuit board that may also hold storage system 550 and portions of data communication interface 510 and administration interface 520.

Operating software 560 comprises computer programs, firmware, or some other form of machine-readable processing instructions. Operating software 560 includes administration system logic for administration interface 520, IP packet logic 580 that inspects and relays IP datagrams that pass through data communication interface 510, and amount targeting logic 570 that implements steps 210 and 220 of behaviors 200 for processing the amount of GTP tunnels to determine a target amount of P-GWs. Operating software 560 may also include an operating system, utilities, drivers, network interfaces, applications, or some other type of software. When executed by processing circuitry 545, operating software 560 directs processing system 540 to operate control system 500 in accordance with s amount targeting logic 570.

The implementation of amount targeting logic 570 may be an aggregation of internal modules such as those shown. GTP packet processor 572 interacts with IP packet logic 580 to obtain and dissect GTP packets. If needed GTP packet processor also performs GTP session correlation or QCI determination. GTP packet processor 572 transfers the relevant GTP usage details to tunnels meter 576. Tunnels meter 576 uses the relevant details, such as header fields of enveloping and tunneled packets, to determine the current amount of GTP tunnels and convey this amount along with any QCI information to target calculator 578. Target calculator 578 processes the amount or QCIs of GTP tunnels to determine a target amount of P-GWs. An implementation may use a lookup table, formula, algorithm, or combination of these to determine a target amount of P-GWs. Target calculator 578 transfers its results to target instructor 579. Target instructor 579 informs a VNE system to achieve the target amount of P-GWs. Implementations of amount targeting logic 570 have flexibility as to how many logic modules are present and how responsibilities are distributed amongst the modules.

Figure 6:
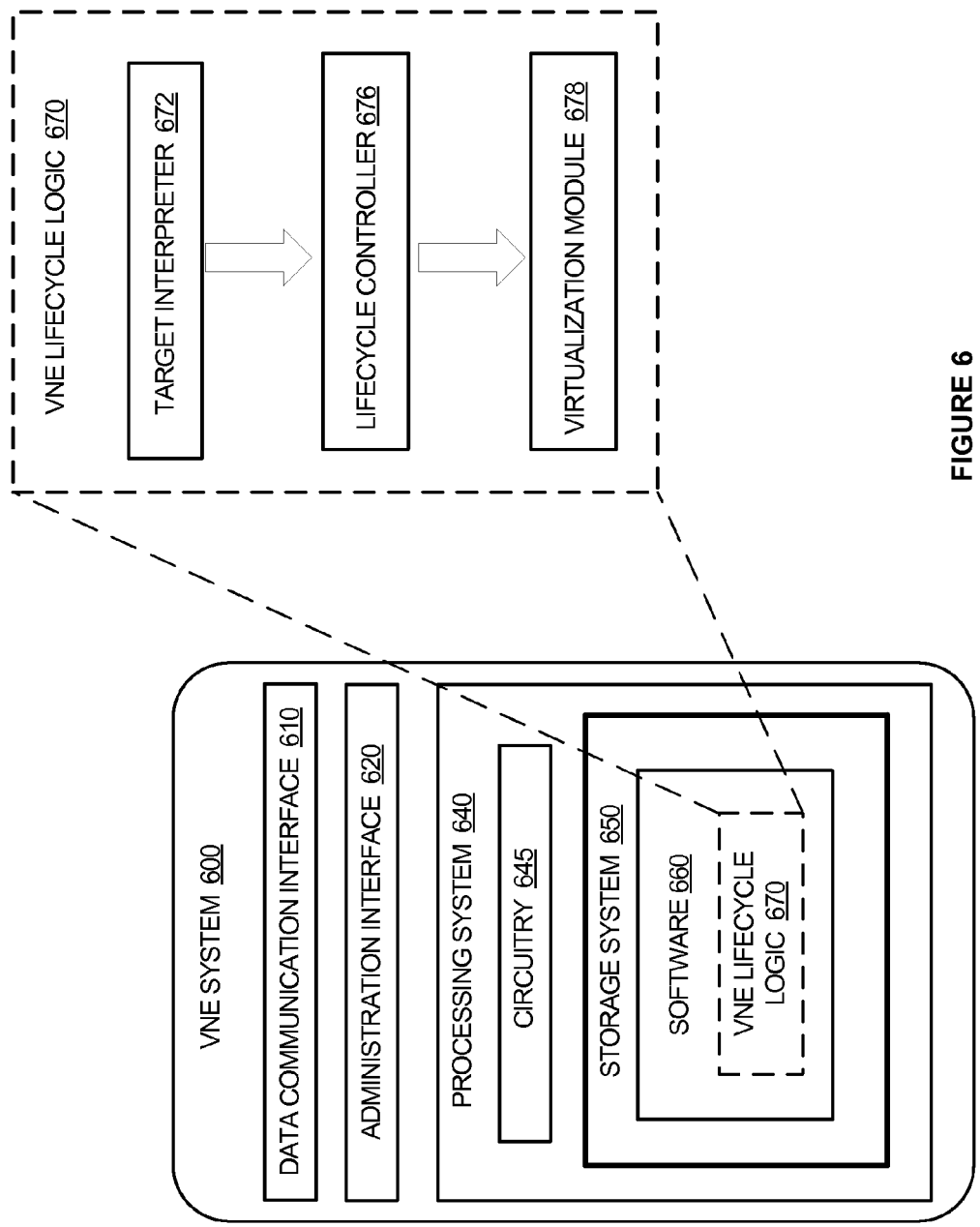
FIG. 6 illustrates an internal configuration of a VNE system.

FIG. 6 illustrates an internal configuration of VNE system 600 that implements steps 230, 240, and 250 of behaviors 200 for achieving a target amount of virtual P-GWs and other VNEs. VNE system 600 may be the internal configuration of VNE systems 330 and 430 or a component of LTE network 100. However VNE systems 330 and 430 and LTE network 100 may have different internal configurations. VNE system 600 includes data communication interface 610, administration interface 620 and processing system 640. Processing system 640 is linked to data communication interface 610 and administration interface 620. Processing system 640 includes processing circuitry 645 and storage system 650, which are connected. Storage system 650 stores operating software 660. VNE system 600 may include other well-known components such as a power supply and enclosure that are not shown for clarity.

Data communication interface 610 connects to network infrastructure via a set of network links which each may by wireless or cabled. VNE system 600 communicates with LTE base stations, IP routers, and other LTE network components over data communication interface 610. Data communication interface 610 has communication circuitry such as an amplifier, filter, signal modulator, and signal processing circuitry that is appropriate to the transmission medium that carries the network link.

Administration interface 620 includes hardware necessary to achieve configuration and monitoring of control system 600. Administration interface 620 may include user interface devices such as a display and keyboard. Administration interface 620 may accept administration commands issued remotely and received perhaps by data communication interface 610.

Processing circuitry 645 comprises microprocessor and other circuitry that retrieves and executes operating software 660 from storage system 650. Storage system 650 comprises a non-transitory storage medium, such as a disk drive, flash drive, data storage circuitry, or some other memory apparatus. Processing circuitry 645 is typically mounted on a circuit board that may also hold storage system 650 and portions of data communication interface 610 and administration interface 620.

Operating software 660 comprises computer programs, firmware, or some other form of machine-readable processing instructions. Operating software 660 includes administration system logic for administration interface 620 and VNE lifecycle logic 670 that implements steps 230, 240, and 250 of behaviors 200 for achieving a target amount of virtual P-GWs or other VNEs. Operating software 660 may also include an operating system, utilities, drivers, network interfaces, applications, or some other type of software. When executed by processing circuitry 645, operating software 660 directs processing system 640 to operate VNE system 600 in accordance with VNE lifecycle logic 670.

The implementation of amount VNE lifecycle logic 670 may be an aggregation of internal modules such as those shown. From data communication interface 610, target interpreter 672 receives a target amount of P-GWs. Target interpreter 672 compares the current and target amounts of P-GWs to implement or remove amounts and types of VNEs. Target interpreter directs lifecycle controller 676 to perform the implementation and removal of VNEs. Lifecycle controller 676 notifies virtualization module 678 of dynamic adjustments to the virtualization environment needed to support the new amount of VNEs, such as management of pools of spare VNEs or other pooled resources. Implementations of VNE lifecycle logic 670 have flexibility as to how many logic modules are present and how responsibilities are distributed amongst the modules.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a Long Term Evolution (LTE) network having a plurality of base stations and Service Gateways (S-GWs), the method comprising:
   processing General Packet Radio Service (GPRS) Tunneling Protocol (GTP) packets to determine an amount of GTP tunnels between the base stations and the S-GWs;
   processing the amount of GTP tunnels between the base stations and the S-GWs to determine a target amount of LTE Packet Data Network Gateways (P-GWs) to serve the base stations;
   if the target amount of LTE P-GWs is greater than a current amount of LTE P-GWs, then implementing an additional amount of virtual LTE P-GWs to serve the base stations; and
   if the target amount of LTE P-GWs is less than the current amount of LTE P-GWs, then removing an extra amount of virtual LTE P-GWs that serve the base stations.

2. The method of claim 1 wherein processing the amount of the GTP tunnels to determine the target amount of LTE P-GWs comprises processing Quality of Service (QoS) Class Identifiers (QCIs) for the GTP tunnels to determine the target amount of LTE P-GWs.

3. The method of claim 1 further comprising:
   processing the amount of GTP tunnels to determine a target amount of LTE Mobility Management Entities (MMES) to serve the base stations;
   if the target amount of the LTE MMES is greater than a current amount of LTE MMES, then implementing an additional amount of virtual LTE MMES to serve the base stations; and
   if the target amount of the LTE MMES is less than the current amount of LTE MMES, then removing an extra amount of the virtual LTE MMES that serve the base stations.

4. The method of claim 3 wherein processing the amount of the GTP tunnels to determine the target amount of LTE MMES comprises processing QCIs for the GTP tunnels to determine the target amount of the LTE MMEs.

5. The method of claim 1 further comprising:
   processing the amount of GTP tunnels to determine a target amount the LTE S-GWs to serve the base stations;
   if the target amount of the LTE S-GWs is greater than a current amount of the LTE S-GWs, then implementing an additional amount of virtual LTE S-GWs to serve the base stations; and if the target amount of the LTE S-GWs is less than the current amount of the LTE S-GWs, then removing an extra amount of the virtual LTE S-GWs that serve the base stations.

6. The method of claim 5 wherein processing the amount of the GTP tunnels to determine the target amount of the LTE S-GWs comprises processing QCIs for the GTP tunnels to determine the target amount of LTE S-GWs.

7. The method of claim 1 further comprising:
processing the amount of GTP tunnels to determine a target amount of LTE Policy, Charging, and Rules Functions (PCRFs) to serve the base stations;
if the target amount of LTE PCRFs is greater than a current amount of LTE PCRFs, then implementing an additional amount of virtual LTE PCRFs to serve the base stations; and
if the target amount of LTE PCRFs is less than the current amount of LTE PCRFs, then removing an extra amount of virtual LTE PCRFs that serve the base stations.

8. The method of claim 1 further comprising:
processing the amount of GTP tunnels to determine a target amount of video coding servers to serve the base stations;
if the target amount of video coding servers is greater than a current amount of video coding servers, then implementing an additional amount of virtual video coding servers to serve the base stations; and
if the target amount of the video coding servers is less than the current amount of video coding servers, then removing an extra amount of virtual video coding servers that serve the base stations.

9. The method of claim 1 further comprising:
processing the amount of GTP tunnels to determine a target amount of Internet Multimedia Subsystem (IMS) servers to serve the base stations;
if the target amount of IMS servers is greater than a current amount of IMS servers, then implementing an additional amount of virtual IMS servers to serve the base stations; and
if the target amount of IMS servers is less than the current amount of IMS servers, then removing an extra amount of virtual IMS servers that serve the base stations.

10. A Long Term Evolution (LTE) network having a plurality of base stations and Serving Gateways (S-GWs), the LTE network comprising:
an IP router configured to process General Packet Radio Service (GPRS) Tunneling Protocol (GTP) packets to determine an amount of GTP tunnels between the base stations and the S-GWs and to process the amount of GTP tunnels between the base stations and the S-GWs to determine a target amount of LTE Packet Data Network Gateways (P-GWs) to serve the base stations;
an LTE virtual network element system configured to implement an additional amount of virtual LTE P-GWs to serve the base stations if the target amount of LTE P-GWs is greater than a current amount of the LTE P-GWs, and to remove an extra amount of virtual LTE P-GWs that serve the base stations if the target amount of LTE P-GWs is less than the current amount of LTE P-GWs.

11. The LTE network of claim 10 wherein process the amount of the GTP tunnels to determine the target amount of LTE P-GWs comprises process Quality of Service (QoS) Class Identifiers (QCIs) for the GTP tunnels to determine the target amount of LTE P-GWs.

12. The LTE network of claim 10 wherein the IP router is further configured to process the amount of GTP tunnels to determine a target amount of LTE Mobility Management Entities (MMES) to serve the base stations, and the LTE virtual network element system is further configured to implement an additional amount of virtual LTE MMES to serve the base stations if the target amount of LTE MMEs is greater than a current amount of LTE MMEs, and to remove an extra amount of virtual LTE MMEs that serve the base stations if the target amount of LTE MMEs is less than the current amount of LTE MMEs.

13. The LTE network of claim 12 wherein process the amount of the GTP tunnels to determine the target amount of LTE MMEs comprises process QCIs for the GTP tunnels to determine the target amount of LTE MMEs.

14. The LTE network of claim 10 wherein the IP router is further configured to process the amount of GTP tunnels to determine a target amount of LTE S-GWs to serve the base stations, and the LTE virtual network element system is further configured to implement an additional amount of virtual LTE S-GWs to serve the base stations if the target amount of LTE S-GWs is greater than a current amount of LTE S-GWs, and to remove an extra amount of virtual LTE S-GWs that serve the base stations if the target amount of LTE S-GWs is less than the current amount of LTE S-GWs.

15. The LTE network of claim 14 wherein processing the amount of GTP tunnels to determine the target amount of LTE S-GWs comprises processing QCIs for the GTP tunnels to determine the target amount of LTE S-GWs.

16. The LTE network of claim 10 wherein the IP router is further configured to process the amount of GTP tunnels to determine a target amount of LTE Policy Charging Rules Functions (PCRFs) to serve the base stations, and the LTE virtual network element system is further configured to implement an additional amount of virtual LTE PCRFs to serve the base stations if the target amount of LTE PCRFs is greater than a current amount of LTE PCRFs, and to remove an extra amount of virtual LTE PCRFs that serve the base stations if the target amount of LTE PCRFs is less than the current amount of LTE PCRFs.

17. The LTE network of claim 10 wherein the IP router is further configured to process the amount of GTP tunnels to determine a target amount of LTE video coding servers to serve the base stations, and the LTE virtual network element system is further configured to implement an additional amount of virtual LTE video coding servers to serve the base stations if the target amount of LTE video coding servers is greater than a current amount of LTE video coding servers, and to remove an extra amount of virtual LTE video coding servers that serve the base stations if the target amount of LTE video coding servers is less than the current amount of LTE video coding servers.

18. The LTE network of claim 10 wherein the IP router is further configured to process the amount of GTP tunnels to determine a target amount of LTE IMS servers to serve the base stations, and the LTE virtual network element system is further configured to implement an additional amount of virtual LTE Internet Multimedia Subsystem (IMS) servers to serve the base stations if the target amount of LTE IMS servers is greater than a current amount of LTE IMS servers, and to remove an extra amount of virtual LTE IMS servers that serve the base stations if the target amount of LTE IMS servers is less than the current amount of LTE IMS servers.

* * * * *